United States Patent Office 3,496,203
Patented Feb. 17, 1970

3,496,203
TERTIARY ORGANOPHOSPHINE-COBALT-
CARBONYL COMPLEXES
Rupert C. Morris, Berkeley, John L. Van Winkle, San Lorenzo, and Ronald F. Mason, Mill Valley, Calif., assignors to Shell Oil Company, New York, N.Y., a corporation of Delaware
No Drawing. Original application June 30, 1965, Ser. No. 468,575. Divided and this application Sept. 9, 1968, Ser. No. 778,894
Int. Cl. C07f *15/06;* B01j *11/22;* C07d *105/02*
U.S. Cl. 260—439                                                5 Claims

ABSTRACT OF THE DISCLOSURE

Novel catalysts of cobalt in complex combination with carbon monoxide and a tertiary, seven-member heterocyclic phosphine for use in an improved hydroformylation process to effect the direct, single-stage production of reaction products consisting predominantly of primary alcohol by reacting an olefinic compound with carbon monoxide and hydrogen at a temperature between about 100° and 300° C. and super atmospheric pressure in the presence of said catalyst.

---

This is a division of applicants' copending application Ser. No. 468,575, filed June 30, 1965 now abandoned.

This invention relates to the production of alcohols from olefinically unsaturated compounds and novel catalysts therefor. The invention relates more particularly to the production of primary alcohols by the addition of carbon monoxide and hydrogen to olefinic hydrocarbons in the presence of a new and improved catalyst.

Processes directed to the production of reaction mixtures comprising substantial amounts of aldehydes and at times lesser amounts of alcohols by the reaction of olefinic compounds with carbon monoxide and hydrogen at elevated temperatures and pressure in the presence of certain catalysts are well known in the art. The aldehydes and alcohols produced generally correspond to the compounds obtained by the addition of a carbonyl or carbinol group to an olefinically unsaturated carbon atom in the starting material with simultaneous saturation of the olefin bond. Isomerization of the olefin bond may take place to varying degrees under certain conditions with the consequent variation in the products obtained. These processes known in the industry and referred to herein as hydroformylation, involve reactions which may be shown in the general case by the following equation:

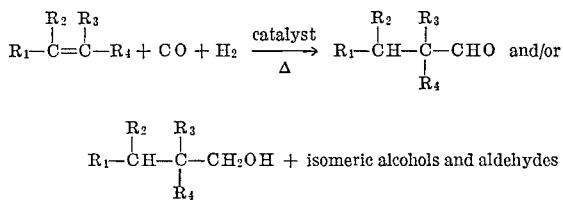

In the above equation, each R represents an organic radical, for example hydrocarbyl, or a suitable atom such as hydrogen. The above reaction is similarly applied to an olefinic linkage in a cycloaliphatic ring.

A disadvantage of hydroformylation processes disclosed heretofore is their dependence upon the use of catalysts, such as dicobalt octacarbonyl, which generally necessitate the use of exceedingly high pressures to remain stable under the conditions therein employed. A further disadvantage of many of the processes disclosed heretofore is their inability to produce hydroformylation products directly comprising substantial amounts of alcohols, thereby necessitating a separate aldehyde hydrogenation step when alcohols are a desired product. The production of hydroformylation products having a relatively high normal to branched product isomer ratio is often also exceedingly difficult if at all possible in many of the practical scale processes heretofore disclosed.

In copending application of L. H. Slaugh and R. D. Mullineaux, Ser. No. 280,132, filed May 13, 1963, now U.S. Patent No. 3,239,956 is described a hydroformylation process to effect the direct, single-stage hydroformylation of olefins to a reaction mixture wherein the alchols predominate over the aldehydes, utilizing substantially lower pressures and a cobalt catalyst comprising cobalt in complex formation with carbon monoxide and a phosphorus-containing ligand consisting essentially of a tertiary organophosphine, such as tri-n-butylphosphine.

A shortcoming in the aforementioned process utilizing trihydrocarbylphosphines such as tributylphosphine is the conversion of a portion of the starting olefin to saturated hydrocarbon, a side reaction decreasing the yield of the desirable and commercially valuable alcohol product. Another is a relatively slow rate of hydroformylation.

It is therefore an object of the present invention to provide novel catalysts for use in an improved hydroformylation process to effect the direct, single-stage hydroformylation of olefins to produce reaction products consisting predominantly of primary alcohols and at the same time to reduce the quantity of side-reaction forming saturated hydrocarbon.

Another object of the present invention is the provision of an improved hydroformylation process enabling the more efficient production of primary alcohols by rapid reaction of olefinic compounds with carbon monoxide and hydrogen in the presence of a new and improved hydroformylation catalyst. Other objects and advantages of the present invention will become apparent from the following detailed description thereof.

In accordance with the present invention, olefinic compounds are converted to primary alcohols having one more carbon atom than the olefinic compounds by reacting the olefinic compounds in liquid phase, with carbon monoxide and hydrogen, at a temperature between about 100° and about 300° C. in the presence of a novel catalyst comprising cobalt in complex combination with carbon monoxide and a particular class of tertiary organophosphines.

In their active form, the suitable novel complex catalysts contain the cobalt in a reduced valence state. This will normally be a zero valence state and may suitably be even lower, such as a —1 valence state. As used throughout this specification and claims, the term "complex" means a coordination compound formed by the union of one or more electronically rich molecules or atoms capable of independent existence with one or more electronically poor molecules or atoms, each of which is also capable of independent existence.

In the suitable special class of ligands described hereinafter containing trivalent phosphorus comprised in the novel complex catalyst employed in the process of the invention, the phosphorus atom has one available or unshared pair of electrons. When trivalent phosphorus has such an electronic configuration, it is capable of forming a coordinate bond with cobalt in its 0 and —1 valence state. It will thus operate as a ligand in forming the desired novel cobalt complexes used as catalysts in the present invention.

The specific class of tertiary organophosphine, which is a suitable ligand for the novel cobalt-containing catalysts of the present invention, is a seven-member heterocyclic tert-phosphine. These particular phosphines may be represented by the formula

where —Q— represents 1,6-hydrocarbylene and substituted 1,6-hydrocarbylene and R represents hydrocarbyl. By the term "1,6-hydrocarbylene" is meant the diradical formed by removal of one hydrogen atom from each of two different carbons, said carbons separated by four carbons, of a saturated or unsaturated hydrocarbon containing at least six carbons. Thus, for example, when the 1,6-hydrocarbylene diradical is a hexamethylene, substituted or unsubstituted, the phosphine of the present invention is a phosphepane. The —Q— providing the 6-carbon bridge, i.e., the 1,6-hydrocarbylene, may be any such radical composed solely of carbon and hydrogen and having a wide variety of alkyl, alkenyl, cycloalkyl, aryl, aralkyl, alkaryl, fused ring, straight chain, branched chain, and the like, hydrocarbon substituents and structures. Representative hydrocarbyl substituents on the 1,6-hydrocarbylene diradical include methyl, tert-butyl, hexenyl, isooctyl, decyl, cyclohexyl, phenyl, 1,4-butadienylene, benzyl, phenethyl, styryl, and the like. It is preferred that any substituent attached to a bridge carbon contain no more than 10, preferably no more than 6, carbons, and that all such substituents contain no more than 40 carbon atoms. It will be understood that when a substituent completes a fused ring, for example 1,4-butadienylene, to yield 10,11-dihydro-5H - 5 - hydrocarbyl - dibenzo[b,f]-phosphepin,

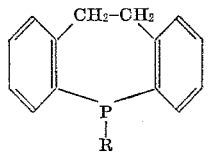

it will be considered that each of two adjacent carbons in the 6-carbon bridge is substituted once with a 2-carbon substituent. Seven-member cyclic tert-phosphines in which there is a single phosphorus-containing ring constitute a preferred class of ligands. The aforementioned substituted 1,6-hydrocarbylene diradicals may also contain a functional group, such as the carbonyl, carboxyl, nitro, amino, hydroxy, cyano, sulfonyl and sulfoxyl functional groups. However, a preferred group of seven-member cyclic tert-phosphines are those represented by the formula

where —Q— represents 1,6-hydrocarbylene diradical of from 6 to 34 carbon atoms, such that any hydrocarbon substituent atached to a bridge carbon atom of said diradical contains no more than ten carbon atoms.

The term "hydrocarbyl" is used in its accepted meaning as representing a radical formed from a hydrocarbon by removal of a hydrogen atom. The hydrocarbyl groups represented by R in the formula above may be any nonacetylenic organic radical composed solely of carbon and hydrogen. The widest variation is possible in that the (nonacetylenic) hydrocarbyl group may be alkyl, alkenyl, cycloalkyl, aryl, aralkyl, alkaryl, single ring, multi-ring, straight chain, branched chain, large or small. Representative hydrocarbyl groups include methyl, ethyl, allyl, n-butyl, hexenyl, isooctyl, dodecyl, octadecyl, eicosyl, hexacosyl, octacosyl, triacontyl, hexatriacontyl, tetracontyl, cyclohexyl, cyclooctyl, phenyl, naphthyl, benzyl, styryl, phenethyl, and the like. Thus, a particularly useful class of seven-member heterocyclic tert-phosphines are those containing only carbon, hydrogen, and phosphorus atoms. Substituted hydrocarbyl groups are also operable and may contain a functional group such as the carbonyl, carboxyl, nitro, amino, hydroxy (e.g. hydroxyethyl), cyano, sulfonyl, and sulfoxyl groups. A preferred group of ligands consists of those in which R is hydrocarbyl of from 4 to 36 carbon atoms.

It is sometimes desirable to balance the size of the substituents in the aforedescribed phosphines. When the substituents of —Q— are numerous and large, it may be desirable to choose a smaller R. Conversely, when R is large, e.g. eicosyl, octacosyl, or hexatriacontyl, it may be desirable that the substituents of —Q— be smaller and/or less numerous, such as monomethyl, dimethyl and the like. Particularly useful ligands are those in which the sum of —Q— and R is no greater than 48 carbon atoms.

Certain ring-carbon substituted seven-member heterocyclic tert-phosphines are novel compounds and their preparation is described in copending application of R. F. Mason and of J. L. Van Winkle, Ser. No. 468,574, filed June 30, 1965, now abandoned. The aforementioned dihydrohydrocarbyl-dibenzophosphepin, wherein the substituents are fused rings, is prepared in Mann, F. G., et al., J. Chem. Soc. 1953, 1130. Seven-member heterocyclic tert-phosphines with no ring carbon substituents are prepared by R. I. Wagner, U.S. 3,086,053, from the reaction of hexamethylene dihalides with monosubstituted alkali metal derivatives of primary phosphines in a liquid ammonia medium.

Suitable and novel catalysts of the invention include the tertiary organophosphine-cobalt-carbonyl complexes represented by the empirical formula

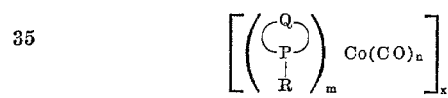

wherein Q and R are represented as above, $m$ and $n$ represent integers, each having a value of at least 1 and whose sum is 4, and $x$ represents an integer from 1 to 3. Preferred catalysts of the above-defined class comprise those wherein —Q— represents 1,6-hydrocarbylene radical containing from 6 to 34 carbon atoms such that any hydrocarbon substituent attached to a bridge carbon atom of said diradical contains no more than 10 carbon atoms, and R represents hydrocarbyl containing from 4 to 36 carbon atom. A particularly preferred group of catalysts within the above-defined class are the seven-member heterocyclic tert-phosphine - cobalt - carbonyl complexes wherein the total number of carbons in the tertiary phosphine

does not exceed about 48.

It is to be understood that the suitable novel catalysts identified by the foregoing empirical Formula I may comprise two or more of the

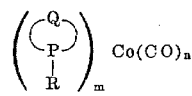

groups. For example, in the suitable catalysts, the novel complex between cobalt, carbon monoxide, and phosphine ligand may be monomeric in structure or may be composed of several monomeric units. Thus, the novel complex may be present as a dimer, e.g., a bis(phosphine) dicobalt hexacarbonyl.

Representative examples of suitable catalysts of the above-defined class comprise novel complexes between cobalt, carbon monoxide, and one of the following phosphines, especially as the bis(phosphine) dicobalt hexacarbonyl:

1-phenylphosphepane
1-cyclohexylphosphepane
1-ethylphosphepane
1-(1-methylheptadecyl)phosphepane
1-octadecylphosphepane
1-eicosylphosphepane
1-triacontylphosphepane
3,6-dimethyl-1-phenylphosphepane
2,3,6-dimethyl-1-octadecylphosphepane
3,6-dimethyl-1-(1-methylheptadecyl)phosphepane
1-eicosyl-3,6-dimethylphophepane
3,6-dimethyl-1-octacosylphosphepane
3,6-dimethyl-1-hexatriacontylphosphepane
10,11-dihydro-5H-5-phenyl-dibenzo[b,f]phosphepin Of these catalysts, those of the 3,6-dialkyl-1-hydrocarbylphosphepanes are somewhat preferred. A particularly preferred catalyst comprises cobalt-tricarbonyl-1-eicosyl-3,6-dimethylphosphepane, believed to be dimeric

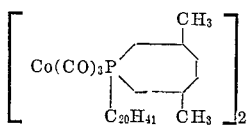

The novel catalysts can be prepared by a diversity of methods. A convenient method is to combine a cobalt salt, organic or inorganic, with the desired phosphine ligand, for example, in liquid phase. Suitable cobalt salts comprise, for example, cobalt carboxylates such as acetates, octanoates, etc, as well as cobalt salts of mineral acids, such as chlorides, fluorides, sulfates, sulfonates, etc. Operable also are mixtures of these cobalt salts. It is preferred, however, that when mixtures are used, at least one component of the mixture be cobalt alkanoate of 6 to 18 carbon atoms. The valance state of the cobalt may then be reduced and the cobalt-containing complex formed by heating the solution in an atmosphere of hydrogen and carbon monoxide. The reduction may be performed prior to the use of the catalysts or it may be accomplished simultaneously with the hydroformylation process in the hydroformylation zone. Alternatively, the novel catalysts can be prepared from a carbon monoxide complex of cobalt. For example, it is possible to start with dicobalt octacarbonyl and, by heating this substance with a suitable phosphine ligand of the class previously described, the ligand replaces one or more of the carbon monoxide molecules, producing the desired catalyst. When this latter method is executed in a hydrocarbon solvent, the complex may be precipitated in crystalline form by cooling the hot hydrocarbon solution. X-ray analyses of the isolated crystalline solid show the crystalline form of the complex to be a dimer with a linear P—Co—Co—P group in the molecule. For example, bis(1-eicosyl-3,6-dimethylphosphepane) dicobalt hexacarbonyl, recrystallized from n-butanol, is a rust-colored crystalline solid, M.P. 51° C. and exhibiting a strong carbonyl absorption band at a wave number of 1952 cm.$^{-1}$. This method is very convenient for regulating the number of carbon monoxide molecules and phosphine ligand molecules in the catalyst. Thus, by increasing the proportion of phosphine ligand added to the dicobalt octacarbonyl, more of the carbon monoxide molecules are replaced.

In accordance with the invention, olefinic compounds are hydroformylated to reaction products predominating in primary alcohols by intimately contacting the olefinic compound in liquid phase with carbon monoxide and hydrogen in the presence of the above-defined catalysts comprising a complex of cobalt with certain phosphine ligands and carbon monoxide at well defined conditions of temperature and pressure.

A particular advantage of the process of the invention resides in the catalyst stability and its high activity for long periods of time at very low pressures. Consequently, hydroformylation in accordance with the present invention may be carried out at pressures well below 1000 p.s.i.g. to as low as 1 atmosphere or less. Under comparable conditions, the conventional catalyst, dicobalt octacarbonyl, decomposes and becomes inactive. The invention is, however, not limited in its applicability to the lower pressures, and pressures in the range from atmospheric up to about 2000 p.s.i.g. are useful. Even higher ones, such as up to about 5000 p.s.i.g. may be employed. The specific pressure preferably used will be governed to some extent by the specific charge and catalyst employed, as well as equipment requirements. In general, pressures in the range of from about 300 to about 1500 p.s.i.g. and particularly in the range of from about 400 to about 1200 p.s.i.g. are preferred. The unique stability of the catalysts of the present invention at the lower pressures makes the use of pressures below about 1500 p.s.i.g. particularly advantageous.

Temperatures employed will generally range between about 100° and about 300° C. and preferably between about 150° and about 210° C., a temperature of about 200° C. being generally satisfactory. Somewhat higher or lower temperatures may, however, be used.

The ratio of catalyst to the olefin to be hydroformylated is generally not critical and may vary widely. It may be varied to achieve a substantially homogenous reaction mixture. Solvents are therefore not required. However, the use of solvents which are inert, or which do not interfere to any substantial degree with the desired hydroformylation reaction under the conditions employed, may be used. Saturated liquid hydrocarbons, for example, may be used as solvent in the process, as well as alcohols, ethers, acetonitril, sulfolane, and the like. Molar ratios of catalyst to olefin in the reaction zone at any given instant between about 1:1000 and about 10:1 are found to be satisfactory; higher or lower catalyst to olefin ratio may, however, be used, but in general it will be less than 1:1.

The ratio of hydrogen to carbon monoxide charged may vary widely. In general, a mole ratio of hydrogen to carbon monoxide of at least about 1 is employed. Suitable ratios of hydrogen to carbon monoxide comprise those within the range of from about 1 to about 10. Higher or lower ratios may, however, be employed. The ratio of hydrogen to carbon monoxide preferably employed will be governed to some extent by the nature of the reaction product desired. If conditions are selected that will result primarily in an aldehyde product, only one mole of hydrogen per mole of carbon monoxide enters into reaction with the olefin. When the primary alcohol is the preferred product as in the present invention, two moles of hydrogen and one mole of carbon monoxide react with each mole of olefin. The use of ratios of hydrogen to carbon monoxide which are somewhat higher than those defined by these stoichiometrically values are generally preferred.

A signal advantage of the present invention as indicated above and further evidenced by the following examples is the ability to effect the direct, single-stage hydroformylation of the olefins to a reaction mixture wherein primary alcohols predominate over the aldehydes and byproduct saturated hydrocarbons. The alcohols obtained from the starting olefins are furthermore generally primarily the straight chain or normal isomers. By selection of reaction conditions within the above-defined range, it is now possible to obtain a predominant portion of the product in the form of the normal or straight chain compound rather than as its various branched-chain isomers. Generally, the alcohol is the desired end product and the catalysts defined herein will product this product under a relatively wide range of conditions. However, by varying the operating conditions within the range described herein, the ratio of aldehyde to alcohol product may be varied somewhat. Adjustment of these variables also permits some control over the particular isomer that will be produced. A particularly valuable aspect of the invention resides in its ability to effect the direct, single-stage hydroformylation of internal normal olefins, having for example, from 4 to 19 carbon atoms to the molecule to normal terminal alcohols having 5 to 20 carbon atoms to the molecule, respectively. Olefinic hydrocarbon fractions, such as, for example, polymeric olefinic fractions, cracked wax fractions, and the like, containing substantial proportions of internal olefins are readily hydroformylated to fractions of hydroformylated products comprising mixtures of terminal aldehydes and alcohols having one more carbon than the olefins in the charge and wherein these primary alcohols are the predominant reaction product. Such suitable feeds consisting of olefinic hydrocarbon fractions include, for example, $C_7$, $C_8$, $C_9$, $C_{10}$ and higher olefinic fractions as well as olefinic hydrocarbon fractions of wider boiling ranges such as $C_{7-9}$, $C_{10-13}$, $C_{14-17}$ olefinic hydrocarbon fractions and the like.

Under the above-defined conditions, the olefinic charge reacts with carbon monoxide and hydrogen with the formation of reaction products comprising primary alcohols having one more carbon atom per molecule than the olefin charged.

The reaction mixtures obtained may be subjected to suitable catalyst and product separating means comprising one or more such steps, for example, as stratification, solvent extraction, distillation, fractionation, absorption, etc. Catalyst, or components thereof, as well as unconverted charge, may be recycled in part or entirely to the reaction zone.

The process of this invention is generally applicable to the hydroformylation of any aliphatic or cycloaliphatic compound having at least one aliphatic carbon-to-carbon unsaturation, especially an ethylenic carbon-to-carbon bond. Thus, it is applied to the hydroformylation of olefins having, for example, from 2 to 19 carbons to reaction mixtures predominating in aliphatic aldehydes and alkanols having one more carbon atom than the starting olefin. The invention is used to advantage in the hydroformylation of carbon-to-carbon ethylenically unsaturated linkages in hydrocarbons. Monoolefins such as ethylene, propylene, butylene, cyclohexene, 1-octene, dodecene, 1-octadecene and dihydronaphthelene are a few examples of suitable hydrocarbons. Suitable hydrocarbons include both branched- and straight-chain, as well as cyclic compounds having one or more of these ethylenic or olefinic sites. These sites may be conjugated, as in 1,3-butadiene, or non-conjugated, as in 1,5-hexadiene and 1,5-bicyclo[2,2,1]heptadiene. In the case of polyolefins, it is possible to hydroformylate only one of the olefinic sites or several or all of these sites. The unsaturated carbon-to-carbon olefinic linkages may be between terminal and their adjacent carbon atoms, as in 1-pentene, or between internal chain carbon atoms, as in 4-octene.

The process and novel catalyst of this invention may also be used to hydroformylate ethylenic carbon-to-carbon linkages of non-hydrocarbons. Thus, it is possible to hydroformylate olefinically unsaturated alcohols, aldehydes, and acids to corresponding alcohols, aldehydes, and acids containing an aldehyde or hydroxy group on one of the carbon atoms previously involved in the olefinic bond of the starting material; unsaturated aldehydes yield principally diols. The following are a few specific examples of different types of olefinic compounds that may be hydroformylated in accordance with the invention:

$$CH_3(CH_2)_3CH=CH_2 + CO + H_2 \xrightarrow[\Delta]{catalyst} CH_3(CH_2)_5CHO \text{ and/or}$$
1-hexene
1-heptanol

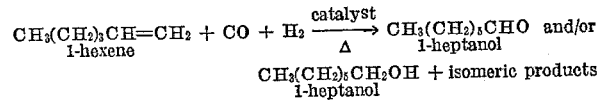

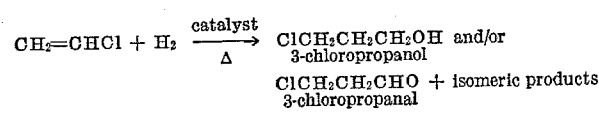

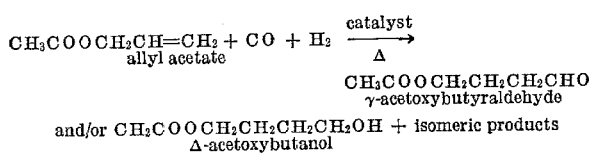

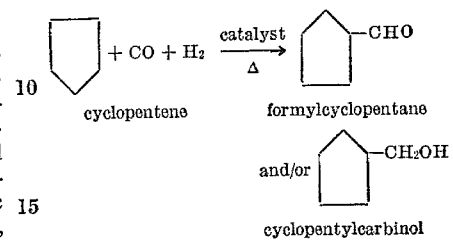

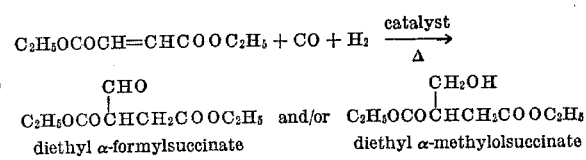

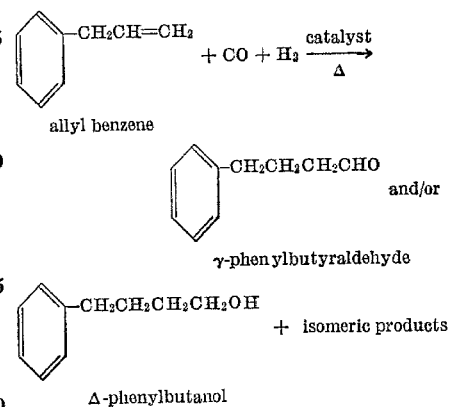

The olefinic charge may comprise two or more of the above-defined suitable olefins. Olefinic hydrocarbon fractions are hydroformylated under the conditions above-defined to mixtures of aldehydes and alcohols in which the alcohols predominate.

The following examples are illustrative of the process of this invention. It is to be understood that these examples are given only for illustration and are not to be construed as limiting the invention to the details thereof.

Examples 1–6

Cobalt catalysts of cobalt in complex combination with carbon monoxide and the below-indicated tertiary phosphine ligands were utilized with 1-dodecene as olefin. The catalysts were prepared in situ, in the equipment to be described, from cobalt octanoate.

The reactor was a 300-ml. stainless steel magnetically stirred autoclave operated at 1250 r.p.m. and connected to a source of a premixed hydrogen-carbon monoxide gas delivered at any desired constant pressure. The components forming the catalyst (e.g., tertiary phosphine and cobalt octanoate) and the olefin, 1-dodecene, were charged to the reactor; the reactor was closed, evacuated, and pressured with $H_2$—CO gas until all foreign gases were displaced. The reactor was then heated under sufficient $H_2$+CO pressure so that the final pressure at reaction temperature was about 1000 p.s.i.g. After the temperature was equilibrated, the pressure reduction was recorded. The reaction conditions and results are tabulated in Table 1.

Example 1 below, utilizing the commercially available tri-n-butylphosphine as the phosphorus ligand, was taken as a comparative control. A comparison between Example 1 and Examples 2–6 shows that the quantity of undesirable saturated hydrocarbon by-product formed when using as ligands the seven-member heterocyclic tert-phosphines of the invention is less by a factor of about one-third to one-fifth, averaging about one-fourth, than that formed when using tri-n-butylphosphine, in spite of the fact that the hydrogenating activity of the novel catalysts in Examples 2-6 was sufficient to insure essentially complete hydrogenation of the intermediate aldehyde.

or normal alcohol over the branched-chain isomers is not so great as with novel catalyst in which the phosphorus ligands are the seven-member heterocyclic tert-phosphines of the invention.

We claim as our invention:

1. A catalyst composition consisting essentially of cobalt in complex combination with carbon monoxide and a seven-member heterocyclic tert-phosphine, said composition having the formula

TABLE 1.—HYDROFORMYLATION OF 1-DODECENE

| Example | Phosphine ligand | Cobalt, wt. percent | Phosphine/Cobalt, mole ratio | $H_2$/CO, mole ratio | Temperature, °C. | Pressure, p.s.i.g. | Time required for 50% conversion, min. | Conversion of 1-dodecene, percent | Conversion to— Saturated hydrocarbon, percent | Conversion to— Primary alkanols, percent |
|---|---|---|---|---|---|---|---|---|---|---|
| 1 | Tri-n-butylphosphine | 0.2 | 2 | 2.1 | 198-202 | 1,000 | 36 | 99.1 | 20.4 | 78.2 |
| 2 | 1-phenylphosphepane | 0.2 | 2 | 2.1 | 198-200 | 1,200 | 24 | 100 | 13.1 | 86.0 |
| 3 | (3,6-dimethyl-1-(2-methylheptadecyl) phosphepane. | 0.2 | 2 | 2.1 | 198-200 | 1,200 | 33 | 97.8 | 15.0 | 82.6 |
| 4 | (1-eicosyl-3,6-dimethyl-phosphepane. | 0.2 | 1.5 | 2.1 | 198-200 | 1,200 | 28 | 97.8 | 15.7 | 80.7 |
| 5 | (3,6-dimethyl-1-phenyl-phosphepane. | 0.2 | 2 | 2.1 | 200 | 1,200 | 22 | 100 | 12.7 | 86.2 |
| 6 | (3,6-dimethyl-1-octadecyl-phosphepane. | 0.2 | 2 | 2.1 | 198-200 | 1,200 | 26 | 98.4 | 16.6 | 81.7 |

A further comparison of the data indicates that when using as ligands the seven-member heterocyclic tert-phosphines one obtains a hydroformylation rate which is faster by a factor of about 1.6 to 1.1, averaging about 1.4, than that obtained with tri-n-butylphosphine.

Example 7

1-dodecene was hydroformylated in the manner described in the previous examples by reaction with carbon monoxide and hydrogen in a $H_2$/CO mole ratio of 2:1, at 198–203° C., a pressure of 1000 p.s.i.g., with a contact time of 30 hours in the presence of a catalyst consisting of triphenylphosphine-cobalt-carbonyl. There was obtained a conversion of 98.8% of the olefin with a selectivity to $C_{13}$ alcohols of 86.1%. Of the $C_{13}$ alcohols obtained, 52% was the linear, straight-chain n-tridecanol, the remainder branched-chain alcohols.

Similarly 1-dodecene was hydroformylated by reaction with carbon monoxide and hydrogen in a $H_2$/CO mole ratio of 2:1, at 200° C., a pressure of 1200 p.s.i.g., with a contact time of three hours in the presence of a novel catalyst consisting of 3,6 - dimethyl-1-phenylphosphepane-cobalt-carbonyl. There was obtained a conversion of the olefin of 100%, with a selectivity to $C_{13}$ alcohols of 86.2%. Of the $C_{13}$ alcohols obtained, 74.4% was the linear, straight-chain n-tridecanol, the remainder branched-chained alcohols.

Similarly 1-dodecene was hydroformylated by reaction with carbon monoxide and hydrogen in a $H_2$/CO mole ratio of 2:1, at 198–200° C., a pressure of 1200 p.s.i.g., with a contact time of three hours in the presence of a novel catalyst consisting of 3,6-dimethyl-1-octadecyl-phosphepane-cobalt-carbonyl. There was obtained a conversion of the olefin of 98.4%, with a selectivity to $C_{13}$ alcohols of 81.7%. Of the $C_{13}$ alcohols obtained, 82% was the linear straight-chain n-tridecanol, the remainder branched-chain alcohols.

It is seen from the foregoing results that with triphenylphosphine as the phosphorus ligand of the catalyst the predominance of the highly desirable linear straight-chain

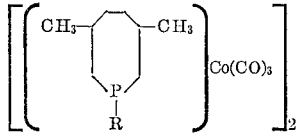

where R is hydrocarbyl selected from the group consisting of phenyl, octadecyl, eicosyl, and 1-methylheptadecyl.

2. The composition in accordance with claim 1 wherein said R is phenyl and the composition is bis(3,6-dimethyl-1-phenylphosphepane)dicobalt hexacarbonyl.

3. The composition in accordance with claim 1 wherein said R is octadecyl and the composition is bis(3,6-dimethyl-1-octadecylphosphepane)dicobalt hexacarbonyl.

4. The composition in accordance with claim 1 wherein said R is 1-methylheptadecyl and the composition is bis (3,6-dimethyl-1 - (1 - methylheptadecyl)phosphepane) dicobalt hexacarbonyl.

5. The composition in accordance with claim 1 wherein said R is eicosyl and the composition is bis(1-eciosyl-3,6-dimethylphosphepane) dicobalt hexacarbonyl.

References Cited

UNITED STATES PATENTS 3,086,056   4/1963   Wagner _____ 260—606.5
3,239,569   3/1966   Slaugh et al. _____ 260—632

FOREIGN PATENTS 1,230,010   12/1966   Germany.

DELBERT E. GANTZ, Primary Examiner

A. P. DEMERS, Assistant Examiner

U.S. Cl. X.R.

252—431; 260—604, 606.5, 618, 632